United States Patent Office 3,159,668
Patented Dec. 1, 1964

3,159,668
POLYMERIC ORGANIC SILICON COMPOUND
Eugene G. Rochow, Winchester, Mass., assignor to General Electric Company, a corporation of New York
No Drawing. Filed Apr. 14, 1961, Ser. No. 102,925
1 Claim. (Cl. 260—448.2)

The present invention relates to polymeric materials containing silicon atoms, carbon atoms and nitrogen atoms in the polymer chain and to the preparation of these materials. More particularly, the present invention is directed to polymeric materials which are the reaction products of organosilanes containing two silicon-bonded cyclohexyl groups and two silicon-bonded hydrolyzable groups and certain diamines.

Polymeric materials containing both silicon atoms and nitrogen atoms in the polymer chain are known in the art. For example, polymeric silazanes, such as polymeric dimethyl silazanes, which contain alternate silicon atoms and nitrogen atoms, have been prepared. However, while these silazanes have certain utility, their use has been limited by the fact that these materials tend to form low molecular weight cyclic materials and therefore the development of high molecular weight silazanes has been hindered.

The present invention is based on my discovery of a polymeric material containing silicon atoms, carbon atoms and nitrogen atoms in the polymeric chain and which polymeric materials can be formed into high molecular weight linear materials without the problems of ring or cyclic formation.

The polymeric materials of the present invention contain a plurality of adjacent repeating units having the unit formula:

(1)

where R is the divalent residue of an aliphatic diamine. The preferred polymeric materials of the present invention are those in which the repeating units have the formula:

(2)
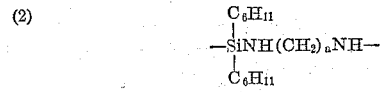

where $a$ is an integer equal to at least 2, e.g., from 2 to 6 or more. These polymeric materials are prepared by effecting reaction between a dihydrolyzable dicyclohexylsilane having the formula:

(3)

where X is a hydrolyzable group, and a diamine selected from the class consisting of polymethylene diamines having the formula:

(4)  $H_2N(CH_2)_aNH_2$ where $a$ is as previously defined and heterocyclic diamines containing two heterocyclic nitrogen atoms.

Another method of describing the preferred polymeric materials of the present invention is by the formula:

(5)
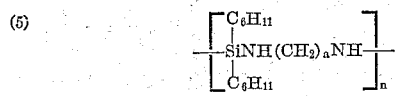

where $a$ is as previously defined and $n$ is a whole number greater than 1, e.g., from 5 to 150 or more and preferably from 5 to 25. Because the polymeric materials of the present invention are prepared by the reaction of two difunctional reactants, the chains of these materials can be terminated by the residue of either reactant. Thus, these materials can be terminated with an Si—X group, where X is as previously defined, or by the residue of the polymethylene diamine, or by monofunctional groups deliberately added for chain termination purposes. The polymeric materials within the scope of the present invention will sometimes hereinafter be referred to as "dicyclohexylsilylamine polymers."

While the dicyclohexylsilylamine polymers of the present invention can be formed by the reaction of any one of a number of dihydrolyzable dicyclohexylsilanes within the scope of Formula 3 with any one of a number of the aliphatic diamines described above, it is preferred that the dihydrolyzable dicyclohexylsilane be dicyclohexyldichlorosilane and that the diamine be ethylene diamine. However, other dihydrolyzable dicyclohexylsilanes, such as other dihalodicyclohexylsilanes, can be employed in the practice of the present invention. In addition to ethylene diamines, other diamines such as butylene diamine, hexamethylene diamine or 1,4-diazocyclohexane can be employed. Where the reaction of the present invention involves dicyclohexyldichlorosilane and ethylene diamine, the polymeric material which results has the formula:

(6)
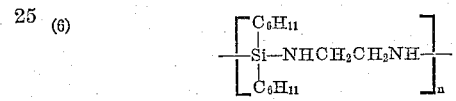

where $n$ is as previously defined.

In carrying out the reaction of the present invention to form the polymeric materials of the present invention, the proportions of reactants and reaction conditions can vary within wide limits. The reaction between the dihydrolyzable dicyclohexylsilane of Formula 3 and the diamine theoretically involves 2 moles of the diamine per mole of the silane. Two moles of the diamine are involved rather than one mole since one of the by-products of the reaction is the dihydrochloride of the diamine. In practice it has been found that satisfactory reaction is obtained when this theoretical ratio of two moles of diamine per mole of the silane is employed. However, it is possible to vary the ratios of the reactants with either reactant being employed in excess. When other than the theoretical ratio of reactants is employed, it is preferred to employ from about 1.75 to 2.25 moles of the diamine per mole of the silane.

In effecting the reaction between the two reactants, it is preferred to employ a solvent in the reaction mixture which will serve to dissolve the polymeric material formed. Preferably, the solvent is a hydrocarbon solvent which can be either aliphatic or aromatic. Among the satisfactory solvents can be mentioned, for example, the aliphatic mineral spirits, benzene, xylene and toluene, or any other solvent which is inert to the reactants under the conditions of the reaction. Preferably, the reaction is effected in the presence of xylene. While the amount of solvent is not critical, it is preferred to have sufficient solvent present to dissolve the polymeric material formed. Generally, this is accomplished by having from 5 to 50 parts by weight of solvent per part of polymeric material expected from the reaction.

Because of the reaction between the dihydrolyzable dicyclohexylsilane and the diamine is highly exothermic and to facilitate the formation of linear polymers, it is desirable to control the temperature of the reaction during its initial stages. This can be accomplished either by controlling the rate of mixing of the two reactants or by using intermittent cooling of the reaction mixture. Generally, both of these methods are employed. The reaction is usually begun by dissolving or mixing one of the reactants, such as the diamine, with the desired solvent and then slowly adding the other reactant to the reaction mixture. After the mixture of the two reactants is completed, the reaction mixture is heated to an elevated temperature, such as a temperature of from about 90 degrees up to the reflux temperature of solvent so as to effect the complete reaction and form a polymeric material of the desire molecular weight.

The time required for effecting the reaction is not critical. Initial reaction between the silane and the diamine occurs simultaneously with the mixing of the reactants. The additional reaction time is employed to effect the further polymerization of the initial reaction product to the desired molecular weight. Generally, this final heating is effected in a time which can vary from a few minutes up to several hours or more.

During the reaction the principal products are the dicyclohexylsilylamine polymer of the present invention and the dihydrochloride of the diamine. This amine hydrochloride precipitates from the reaction mixture along with some polymer of higher molecular weight and can be separated by filtration. The filtrate is then stripped of solvent, preferably at reduced pressures, to produce the polymeric materials of the present invention which are usually hard, brittle masses, but which sometimes are semi-solid materials.

The following examples are illustrative of the practice of my invention and are not intended for purposes of limitation.

*Example 1*

A reaction vessel equipped with a stirrer and reflux condenser was purged with dry nitrogen. To this vessel were added 20.2 grams (0.336 mole) of anhydrous ethylene diamine and 200 ml. xylene. To the reaction vessel was then slowly added 44.5 grams (0.186 mole) of dicyclohexyldichlorosilane diluted with 50 ml. of xylene. The temperature of the reaction vessel was kept at a temperature of 40 to 50° C. by intermittent cooling. After addition of all of the chlorosilane, the contents of the reaction vessel were refluxed for two hours, during which time the amine hydrochloride precipitated, leaving a clear solution of the resinous polymer. The amine hydrochloride was removed by filtration and the xylene was stripped from the filtrate to yield 41.3 grams of a solid polymeric material having the formula:

(7)

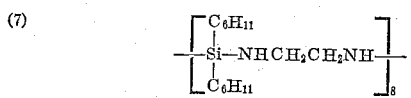

Chemical analysis of this material showed the presence of 66.9% carbon, 11.3% hydrogen, 10.6% nitrogen and 11.3% silicon as compared with the theoretical values of 66.61% carbon, 11.18% hydrogen, 11.10% nitrogen and 11.13% silicon.

*Example 2*

When the procedure of Example 1 is repeated except that 47 grams of hexamethyl diamine are substituted for the 20.2 grams of ethylene diamine, a brittle, solid, resinous polymeric material is formed which consists essentially of the following recurring units:

(8)

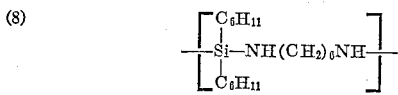

*Example 3*

When the procedure of Example 1 is repeated except that 29.0 grams of anhydrous 1,4-diazocyclohexane having the formula:

(9)

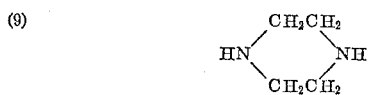

are substituted for the 20.2 grams of ethylene diamine, a solid dicyclohexylsilylamine polymer is formed which consists essentially of the following recurring structural units:

(10)

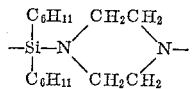

While the foregoing examples have described some of the many variables within the scope of the present invention, it should be understood that dicyclohexylsilylamine polymers within the scope of the present invention can be prepared of different molecular weights and chain lengths than those specifically illustrated in the examples and that other diamines can be employed. In addition, the reaction can be effected with other dihydrolyzable dicyclohexylsilanes than the materials specifically illustrated in the example. Likewise, the reaction conditions can be varied within wide limits.

The products of the present invention have a number of uses. Thus, these products can be used to encapsulate articles such as electronic components. This is effected by dissolving these dicyclohexylsilylamine polymers in a suitable solvent, such as one of the solvents previously described, and casting the solution about the component to be encapsulated. The solvent is then evaporated, leaving a hard coating of resin on the component. The products of the present invention are particularly useful as dielectric materials in the construction of electric capacitors. Thus, one electrode of a capacitor can be coated with a film of the products of this invention by coating one surface of the electrode with a solution of the dicyclohexylsilylamine polymer and evaporating the solvent to form the polymer film. The second electrode can then be added to complete the condenser structure. These polymeric materials are also useful in forming the crosslinked silazanes described in my copending application Serial No. 102,926, filed concurrently herewith (now Patent 3,098,830) and assigned to the same assignee as the present invention.

These dicyclohexylsilylamine polymers are also useful as adhesive materials because of their adherence to many types of surfaces. These polymers are particularly useful as primer coatings on metal surfaces to promote the adhesion of conventional silicone resins and rubbers to these surfaces. When a coating of these polymers is applied to stainless steel blood transfusion apparatus, the apparatus no longer tends to denature the protein in blood which comes into contact with the apparatus.

What I claim as new and desire to secure by Letters Patent of the United States is:

A linear polymeric material having the formula:

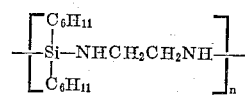

where $n$ has a value of from about 5 to 150, inclusive.

References Cited by the Examiner

UNITED STATES PATENTS

| | | | |
|---|---|---|---|
| 2,876,209 | 3/59 | De Benneville et al. | 260—448.8 |
| 3,036,019 | 5/62 | Molotsky et al. | 260—448.2 |
| 3,098,830 | 7/63 | Rochow | 260—448.2 |

OTHER REFERENCES

Breed et al.: "Jour. Organic Chemistry," volume 25 (October 1960), page 1804–6.

Minne et al.: "Jour. Am. Chem. Soc.," volume 82 (Nov. 5, 1960), page 5625–30.

Henglein et al.: "Makromol. Chem.," volume 32 (1959), page 218–25.

TOBIAS E. LEVOW, *Primary Examiner.*

ALPHONSO D. SULLIVAN, *Examiner.*